United States Patent
McNeilus et al.

(10) Patent No.: US 10,611,326 B2
(45) Date of Patent: Apr. 7, 2020

(54) FENDER ASSEMBLY FOR CONCRETE MIXER TRUCK

(71) Applicant: Con-Tech Manufacturing, Inc., Dodge Center, MN (US)

(72) Inventors: Grant Thomas McNeilus, Dodge Center, MN (US); Brian Ross Meldahl, Brownsdale, MN (US); Jay Phillip Attleson, Rochester, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 15/801,003

(22) Filed: Nov. 1, 2017

(65) Prior Publication Data

US 2019/0126871 A1 May 2, 2019

(51) Int. Cl.
*B60R 19/42* (2006.01)
*B60R 19/03* (2006.01)
*B60R 19/24* (2006.01)
*B62D 25/18* (2006.01)
*B62D 25/16* (2006.01)

(52) U.S. Cl.
CPC .............. *B60R 19/42* (2013.01); *B60R 19/03* (2013.01); *B60R 19/24* (2013.01); *B62D 25/163* (2013.01); *B62D 25/168* (2013.01); *B62D 25/188* (2013.01)

(58) Field of Classification Search
CPC ......... B60R 19/24; B60R 19/42; B60R 19/03; B62D 25/188; B62D 25/163; B62D 25/168

USPC ......................................................... 296/198
See application file for complete search history.

(56) References Cited

U.S. PATENT DOCUMENTS 6,431,605 B1 * 8/2002 Miller .................... B60Q 1/30
116/28 R
2013/0193717 A1 * 8/2013 Rund .................. B62D 25/161
296/198

* cited by examiner

*Primary Examiner* — Joseph D. Pape
*Assistant Examiner* — Dana D Ivey
(74) *Attorney, Agent, or Firm* — Craig J. Lervick; Larkin Hoffman Daly & Lindgren, Ltd.

(57) ABSTRACT

A fender assembly having a non-metallic fender panel configured in a curved manner generally prevents material from accumulating on surfaces thereof, reduces weight of the vehicle, and provides a necessary level of protection from flying rocks and other debris that the wheels of a truck may generate. A non-metallic material is used to form the fender panel, which has a desired level of strength, durability, pliability and coefficient of friction. By carefully selecting this material, the fabrication and installation of the fender assembly is further simplified, thus providing additional efficiency. When applied to a cement mixer truck, the curved fender assembly is particularly beneficial as it provides the necessary level of protection, while also discouraging a build-up of concrete on any surface since the non-metallic material will not generally allow concrete to adhere to the surface.

20 Claims, 6 Drawing Sheets

FENDER ASSEMBLY FOR CONCRETE MIXER TRUCK

BACKGROUND

Concrete mixer trucks are fairly well-known/well-understood pieces of equipment, and are widely used in the construction industry. As is appreciated, these trucks are utilized to mix and transport concrete to various job sites, including building sites, road construction projects, etc.

Concrete mixer trucks are typically used in very harsh environments and are designed to handle very rugged materials. Obviously, these vehicles navigate a wide variety of roadways, including highways, city streets, county roads, gravel roads and other rugged terrain. In many cases, these trucks will also be required to access construction sites, which often do not include maintained roads. Due to these requirements, durability is required. In addition, the handling of concrete itself is a dirty and harsh undertaking. Concrete will often adhere to many surfaces and structures of a mixing truck, and has the potential for causing excess wear and/or damage. As such, it would be highly beneficial to form components and portions of a concrete mixing truck from materials which are 'concrete resistant." This is challenging however, due to the general strength and durability requirements, which often suggests that steel and various metals are utilized.

In addition to the generally harsh characteristics of concrete, cleaning technologies also create challenges. One approach to cleaning concrete mixer truck involves the use of acids and other chemicals. While this is extremely efficient, it also causes corrosion and related deterioration of metal components.

As is also well know, it is important for various vehicles and trucks to have fenders and related guards which prevent rocks and stones from being thrown. These fenders protect others on the roads, and portions of the vehicle itself. Fenders can take many forms, but generally surround and protect various areas around the truck wheels themselves. Typically, the fenders are positioned above the wheels, and may extend part way down the front, back or sides. In some cases however, the configuration of the fender can create an unexpected concern. More specifically, rocks and debris can occasionally accumulate on a flat upper surface of the fender. If not removed, this debris can then be dropped or expelled from the truck while in motion. As would be recognized, this could potentially cause damage to other vehicles, and or other individuals.

In addition to the issues outlined above, damage to fenders is quite common. Again, fenders are specifically designed to contain spray and debris that may be propelled from the wheels. This could include significant rocks and other items that are capable of denting the fenders themselves. More specifically, a rock thrown from a tire into the underside of the fender will typically create a dent. Although the dent will not often prevent use of the truck, it will create paint peeling and unsightly damage which is undesirable. With standard metal fenders, repairing these dents and chipped paint is an involved and cumbersome task.

As the highlighted above, there are certain complications and concerns with the design of concrete mixing trucks. In some cases, the design of the fender itself could be improved.

BRIEF DESCRIPTION OF THE DRAWINGS

Further features and advantages of the composite fender will be appreciated by reading the detailed description outline below, in conjunction with the drawings in which.

DESCRIPTION OF THE PREFERRED EMBODIMENTS

Illustrated in the various figures and further described below is one embodiment of a composite fender assembly 10, which is attachable to a concrete mixing truck (not shown). Although this embodiment is intended for use on a concrete mixing truck, it will be appreciated that this same configuration and design could be utilized for other vehicles. Further, the following description refers to composite fender assembly 10 which has certain components formed of polymers or composite materials. One such component is a fender panel 20, which is used to create a protective panel substantially covering the wheels. Although this assembly is referred to as "composite fender assembly 10" for convenience and consistency, those skilled in the art will appreciate that various components could be formed from many different materials including polymers, plastics, thermoplastics, carbon fibers, other non-metallic materials, etc. It is particularly intended that the fender panel and other components be formed from a non-metallic material which has certain characteristics. As further outlined below, any material can be used which will provide the desired balance of strength, durability, pliability, weight, chemical resistance/tolerance and surface characteristics (e.g. coefficient of friction). It is contemplated that all of these materials are within the scope of the present description, and the discussion below is not limited to a "composite" material which has two different materials.

As shown in FIGS. 1-4, composite fender assembly 10 includes a fender panel 20, which has a curved area or curved upper surface 22, a sloped side portion 24, and a downwardly extending side panel 26. At the bottom edge of side panel 26 is an inward lip 27. Similarly, a bottom edge of sloped side panel 24 will include a ridge 23 and a downward lip 25. In use, fender panel 20 forms an overall protective covering which is configured to be generally positioned above the wheels of the truck.

Figure 2:
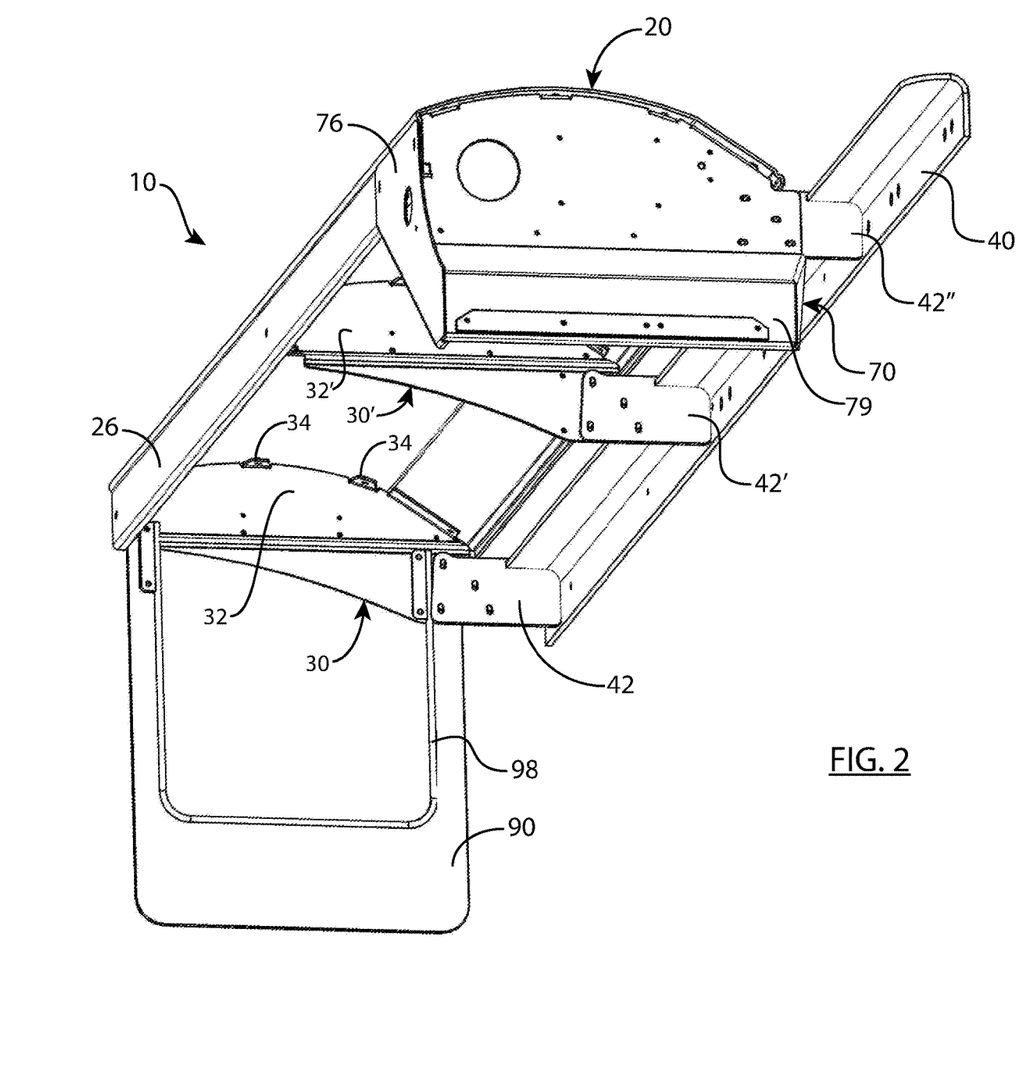
FIG. 2 is a bottom rear perspective view of the composite fender assembly.
Figure 3:
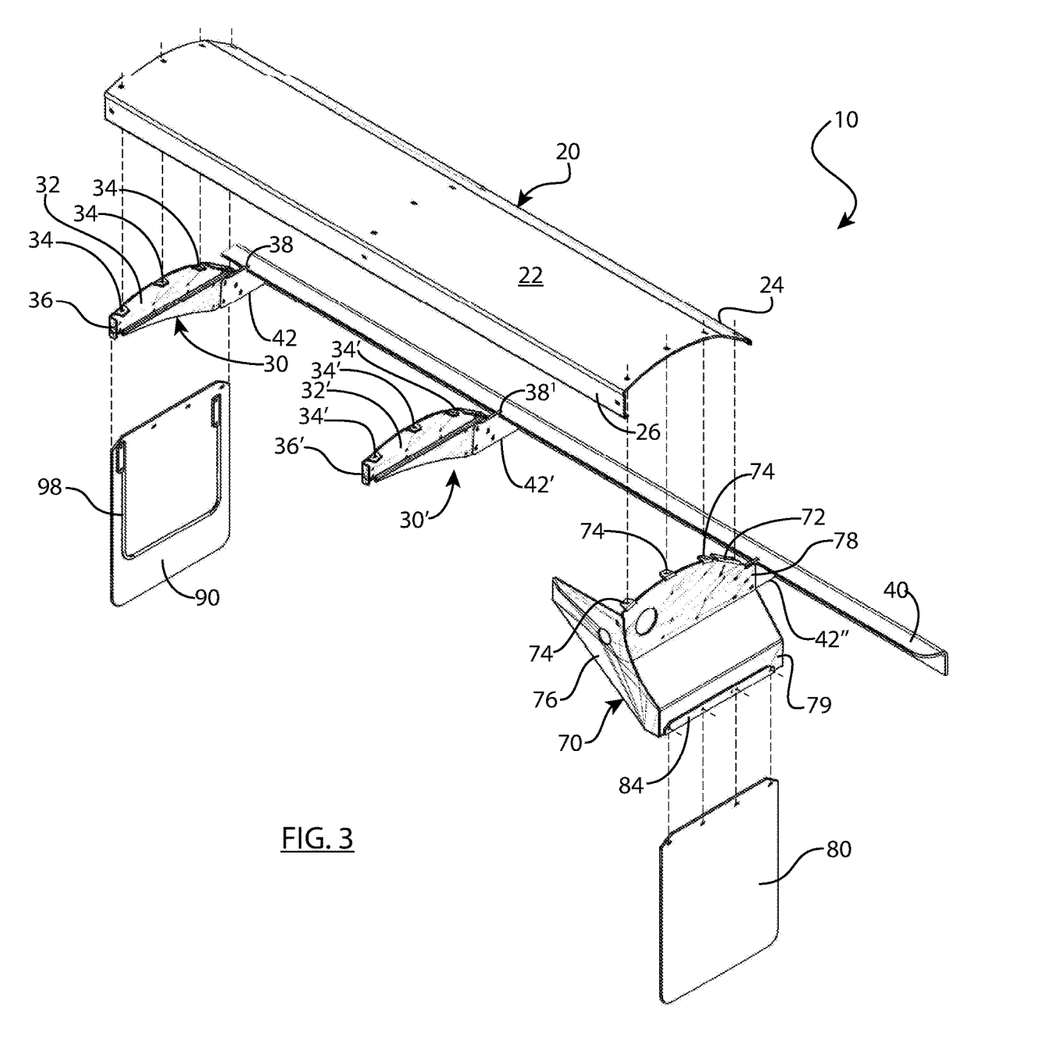
FIG. 3 is an exploded view of one embodiment of the composite fender assembly.
Figure 4A:
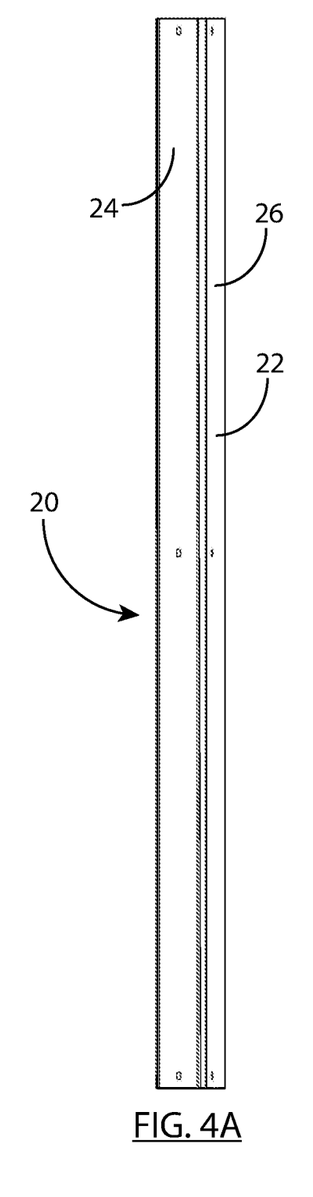
FIG. 4A-4D are various views of the composite fender panel making up of a portion of the composite fender assembly.
Figure 4B:
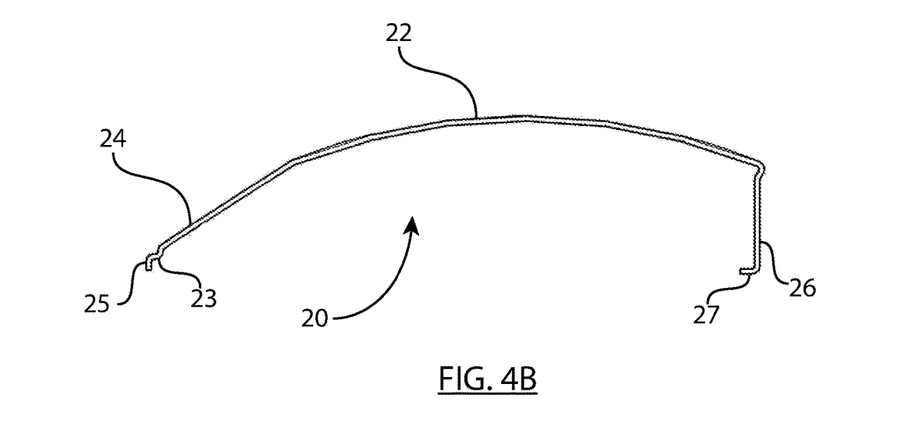
Figure 4C:
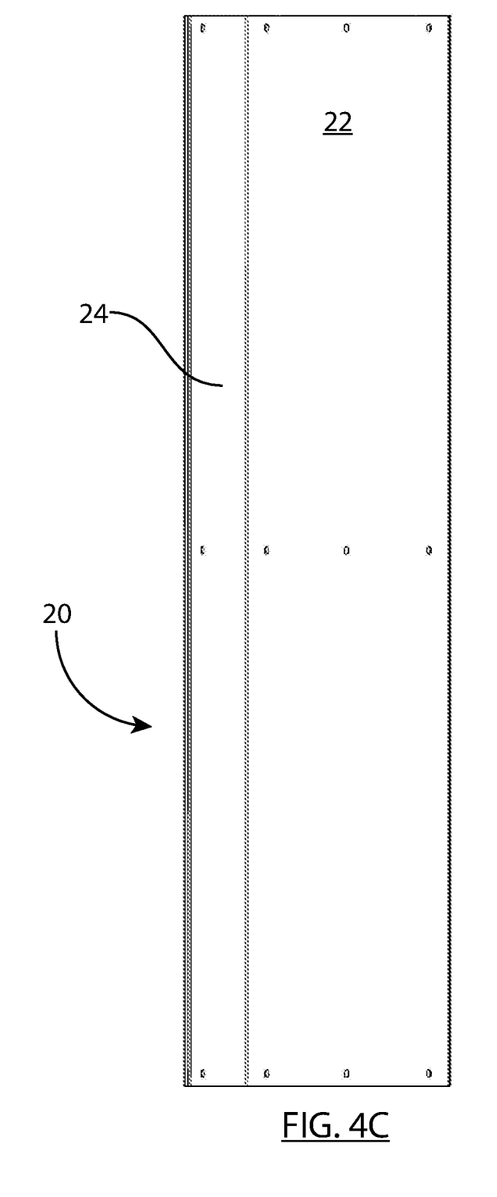
Figure 4D:
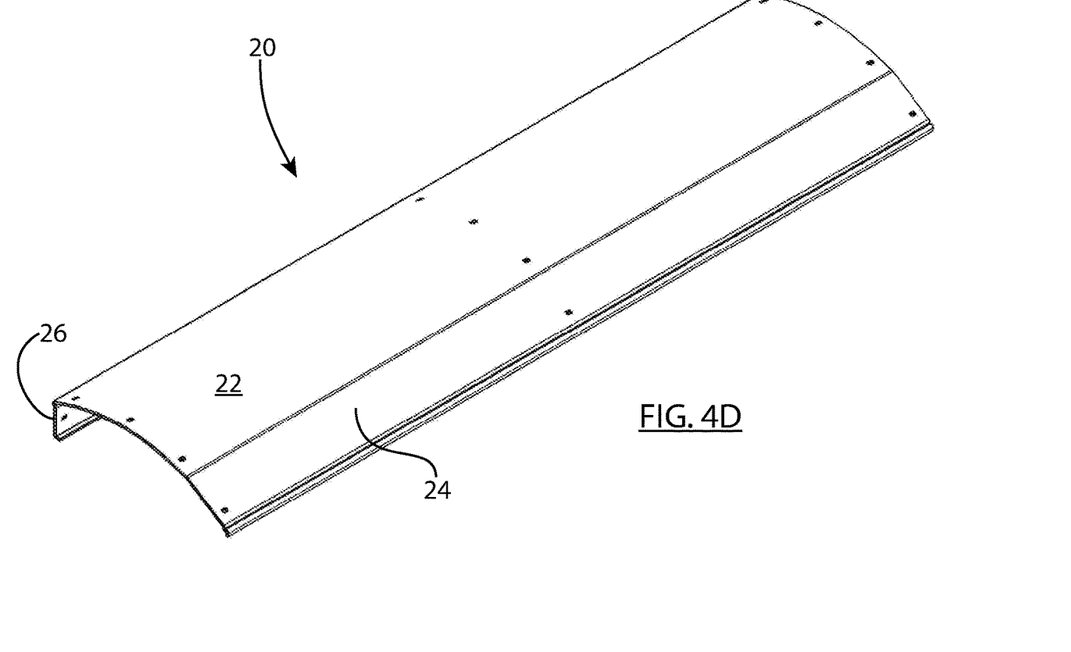

As best illustrated in FIGS. 2 and 3, composite fender assembly 10 also includes a number of support numbers including a first extension 30 and a second extension 30', both configured to extend outwardly from a supporting rail 40. Further, both first extension 30 and second extension 30' are configured to provide a support and an attachment mechanism to accommodate the appropriate positioning of fender panel 20. It is contemplated that first extension 30 and second extension 30' are identical, thus providing flexibility in the fabrication and installation of fender assembly 10. Further, fender assembly 10 may include only first extensions 30, if the dimensions of the vehicle require coverage for a smaller area. Similarly, additional extensions could be added, depending on the needs of the particular installation. For ease of understanding, further details of first extension 30 (occasionally referred to as extension 30) are discussed below, with the understanding that additional components will have the same characteristics.

Figure 1:
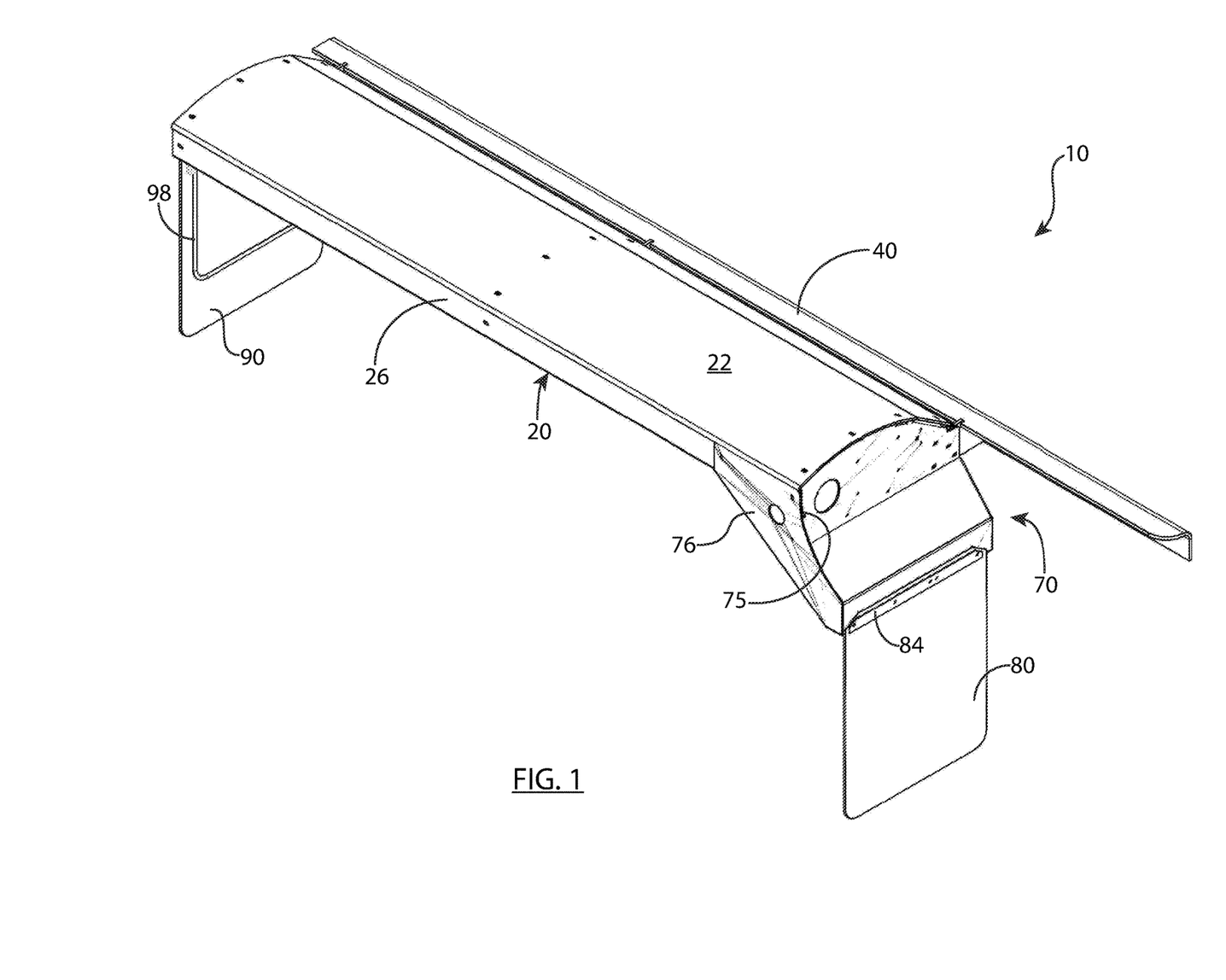
FIG. 1 a perspective view of the composite fender assembly.

In the embodiment illustrated in FIGS. 1-3, extension 30 includes support edge 32 and a plurality of connection tabs 34. Further, extension 30 has an inner support tab 38 on the inner side thereof. As also illustrated, extension 30 also has an outer edge flange 36 which is configured to specifically support side panel 26. In this embodiment, extension 30 is a stamped metal component. In alternative embodiments, extension 30 could be formed from a polymer, plastic, thermoplastic, carbon fiber, nylon, composite, poly based material or any other material capable of providing sufficient support for fender panel 20.

In the embodiments illustrated in FIGS. 1-3, one of the support members is a rear flap bracket 70 which is configured to support fender panel 20 while also accommodating the attachment of a mud flap 80. Again, one embodiment of fender assembly 10 will make use of a stamped metal rear flap bracket 70, although other materials could also be used. Rear flap bracket 70 has an upper edge 72, a plurality of connection tabs 74 and an inner support tab 78, which all form support and attachment structures to accommodate fender panel 20. (Note that the upper edge 72, connection tabs 74 and inner support tab 78 are configured to be very similar to support edge 32, connection tabs 34 and inner support tab 38 of extension 30, and collectively operate to support fender panel 20 in the same way.) Rear flap bracket 70 also has an outward panel 76 which provides structural support, and an attachment surface. Lastly, rear flap bracket 70 also has a flap attachment panel 79 which will accommodate the easy attachment of mud flap 80 using a flap holding plate 84.

As shown in FIGS. 1-3, a front mud flap 90 is attached to extension 30 to provide additional protection. To avoid possible interference with wheels, an anti-sail bracket 98 is also attached to extension 30 to prevent front flap 90 from moving into interference with the truck wheels.

As will be appreciated by one skilled in the art, and best shown in FIGS. 2 and 3, fender panel 20 is designed to be attached to extension 30 in a manner that causes a lower surface of curved area 22 to be resting upon upper edge 32. Similarly, sloped side panel 24 is supported by inner support tab 38 and side panel 26 is adjacent to outer edge flange 36. Using bolts, rivets, or other connection techniques, fender panel 20 is attached to connection tabs 34, support tab 38 on outer edge flange 36. In a similar manner, fender panel 20 is supported by, and attached to flap bracket 70. That said, outer panel 76 of flap bracket 70 is configured to be on the outside of fender panel 20 (and specifically to be positioned outside downward panel 26). Stated differently, downward panel 26 will be situated within an opening 75 in flap bracket 70.

As best shown in FIGS. 2 and 3, fender assembly 10 includes a support rail 40, which is intended to provide support for the plurality of the extension numbers 30, while also accommodating attachment to the frame of the related truck (not shown). In the specific embodiments illustrated, a first connecting tab 42 and a second connecting tab 42' are used to accommodate attachment of extensions 30 and 30', while flap bracket 70 is attached to an additional connecting tab 42". In this embodiment, first extension 30, second extension 30' and flap bracket 70 are bolted to first connecting tab 42, second connecting tab 42' and additional connecting tab 42", respectively. This connection methodology accommodates the easy replacement of components, if needed, and also provides a rigid support structure for fender panel 20. Each connecting tab 42, 42' and 42" is attached to support rail 40, and extends outwardly. In one embodiment, connecting tabs 42, 42' and 42" are welded to support rail. Naturally, alternative connection methodologies could also be used. For example, connecting tabs 42, 42' and 42" could be bolted or riveted to support rail 40. Further, connecting tabs 42, 42' and 42" could be eliminated, and a portion of extension 30 and/or flap bracket 70 could be directly connected to support rail 40 via welding, bolts, rivets, etc.

In FIG. 3, an exploded view of composite fender assembly 10 is shown. In this particular illustration, the components of composite fender assembly 10 are more easily seen. As shown, each support member 30, 30' and flap bracket 70 all provide lateral support for fender panel 20 as necessary. Further, this illustrates that the concepts of the invention can be adapted to different configurations and dimensions. More specifically, while FIG. 3 has both a first support member 30 and a second support member 30', it is clear that only one support member 30 could be included. Similarly, fender panel 20 has a different length. This difference illustrates that the length and particular dimensions of fender panel 20 can be easily modified to accommodate the particular application involved.

The manufacturing of fender panel 20 can be achieved in various ways. In one embodiment, a thermoplastic material is used which allows "drape forming" to be used, where the material will drape over a forming tool when it is heated. Alternatively, fender panel 20 could be molded, or thermoformed, stamped or extruded. Those involved in manufacturing operations will recognize the efficiency and cost savings of these manufacturing approaches can be exploited, depending on various factors.

As generally discussed above fender panel 20 has a curved upper surface 22, and is specifically configured to interact with the related support brackets. FIGS. 4A-4D illustrate details fender panel 20 alone. Again, it is contemplated that fender panel 20 is formed of a polymer or a composite material. This material makes fender panel easy to fabricate, lighter weight and easier to work with. Further, the polymer or composite material is typically dent resistant (due to the considerable amount of material flexibility), it will not rust, can withstand acid wash procedures, and has desired levels of surface friction to insure that concrete will not stick to the surface. These surface characteristics also allow for the easy clean-up of fender panel 20. Additionally, any concrete or residue that does accumulate on a surface of fender panel 20 can be easily broken off due to the flexibility of the materials used.

As mentioned above, fender panel 20 can be easily formed or molded using several different manufacturing techniques. In addition, the inherent flexibility of the materials used will also accommodate assembly and connection to the desired support structures. For example, fender panel is easily fit over extension 30 or flap support 70 by flexing the outer edges. More specifically, inward lip 27 can be fit around the outer portion of extension 30 by flexing the material of fender panel 20. This flexibility can also help to fit downward lip 25 into related grooves in rail 40. As mentioned, bolts, rivets, screws, or other attachment mechanisms can be used to attach these parts.

Figure 5:
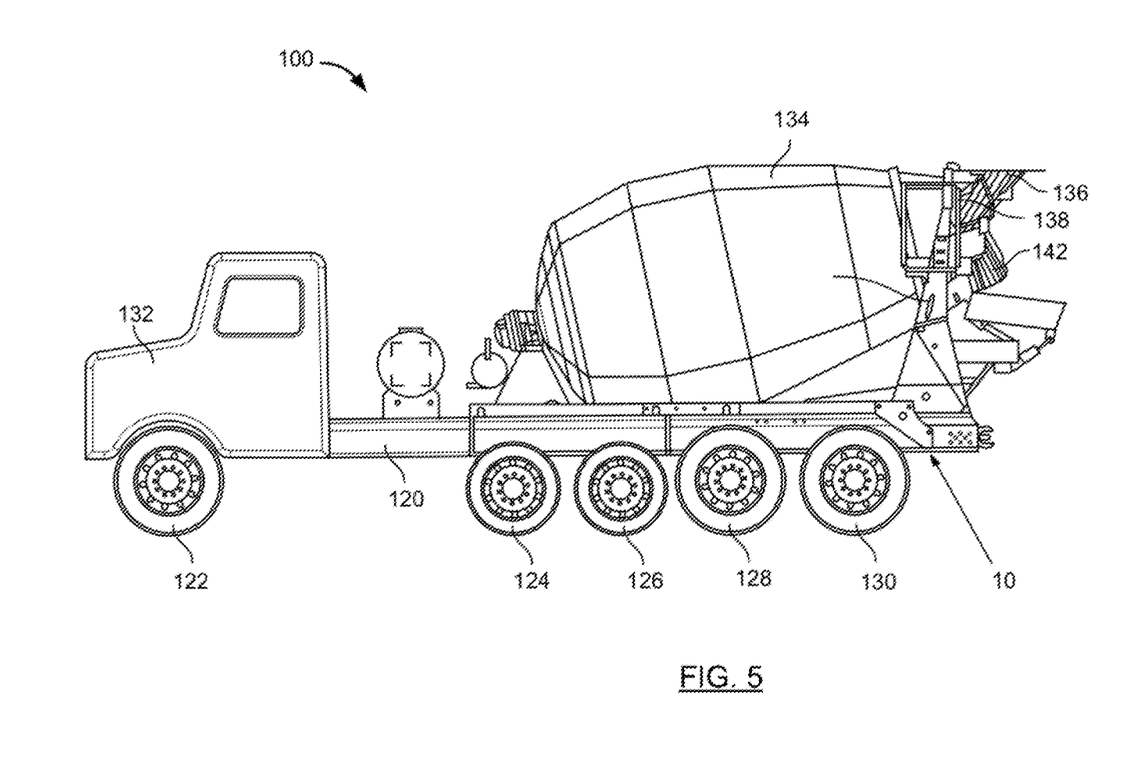
FIG. 5 is a side view of an exemplary concrete mixer truck having a composite fender installed thereon.

As mentioned above, fender assembly 10 is intended to be mounted to a concrete mixer truck or vehicle 100. FIG. 5 illustrates one well known example of concrete mixer truck 100, which includes a main frame or chassis 120 supported by several wheel/axle assemblies including a forward assembly 122 (i.e. front wheel) for steering, and additional load bearing assemblies 124, 126, 128, and 130 (i.e. wheels). Other components supported by the chassis 120 include a cab 132, a mixing drum 134 supported to rotate relative to the chassis, and a charge hopper 136 located behind an upper opening 138 of drum 134. Charge hopper 136 is supported by a rear pedestal 145, which extends upwardly from chassis 120. As also illustrated, and further discussed below, mixer truck 100 includes a collection chute or collector 142 positioned below charge hopper 36. One exemplary embodiment of fender assembly 10 is also shown in FIG. 5.

In addition to the various advantages outlined above, a polymer or composite material provides several aesthetic advantages. Specifically, the composite material can be custom colored to fit the particular design or color scheme of the truck itself. In addition, the composite fenders themselves are easily replaced, should they be damaged, torn or punctured. Attachment is typically achieved utilizing shoulder bolts, fender washer, and other mechanisms which can be easily adjusted. Lastly, the composite materials can be easily formed into various structures, which allows for the "molding" or creation of specific mounting or attachment features.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A fender assembly for use on a concrete mixer truck and at a location in close proximity to a wheel of the truck, comprising:
a plurality of support members attachable to a frame portion of the truck at a location in close proximity the wheel, wherein the support members extend outwardly from the frame portion and wherein each of the plurality of support members have an upwardly oriented and curved supporting surface;
a fender panel having a lower surface in contact with the curved supporting surface of the plurality of support members thereby causing the lower surface of the fender panel to be concave and causing an upper surface of the fender panel to be convex, the fender panel having an outer lip which extends downwardly when the composite fender panel is supported by the supporting members and which covers an end thereof, the fender panel further having an upper surface which is substantially parallel with the lower surface and is positioned opposite the wheel, the upper surface being curved in a shape substantially matching the shape of the curved supporting surface to thus discourage debris from accumulating thereon;
wherein the fender panel is formed of a non-metallic material which is sufficiently pliable so as to conform to the support surface, has a predetermined surface friction level sufficient to discourage concrete from adhering thereto, and wherein the non-metallic material is resistant to denting, rusting and corroding.

2. The fender assembly of claim 1 wherein the fender panel is formed of a material selected from the group of polymers, plastics, carbon fibers, and composites.

3. The fender assembly of claim of claim 2 wherein the support members are formed of a material selected from the group of polymers, plastics, carbon fibers, and composites.

4. The fender assembly of claim 1 wherein the outer lip has an inwardly extending edge at a bottom portion of the lip which is configured to surround the end portion of the support members.

5. The fender assembly of claim 1 wherein the plurality of support members are attached to a connecting bracket on the frame portion via at least one bolt.

6. The fender assembly of claim 1 wherein the plurality of support members comprises a first extension, a second extension and a flap bracket.

7. The fender assembly of claim 6 wherein the flap bracket has a flap support surface substantially perpendicular to the fender panel, and extending downwardly therefrom.

8. The fender assembly of claim 1 wherein the fender panel has a concave lower surface and a convex upper surface when viewed in a transverse direction, while being substantially linear in a longitudinal direction.

9. The fender assembly of claim 8 wherein the fender panel is a single layer of non-metallic material.

10. The fender assembly of claim 9 wherein the outer lip has an inwardly extending edge at a bottom portion of the lip which is configured to surround the end portion of the extension support members, and wherein the downwardly extending outer lip is connected to the support members.

11. A fender assembly for use on a vehicle to prevent debris from being thrown from wheels of the vehicle, comprising:
a non-metallic fender panel formed from a material that is pliable, has a predetermined level of surface friction sufficient to discourage concrete from adhering thereto, and is resistant to denting, rusting and corroding;
a plurality of support members affixed to a frame portion of the vehicle at a location proximate the wheels of the vehicle, each of the plurality of support members extending laterally away from the frame portion and having an upper support surface with a predetermined configuration and an outer edge portion oriented in a downward direction when attached to the vehicle; and
a plurality of connectors connecting the fender panel to the plurality of support members;
wherein the fender panel will conform to the predetermined configuration of the upper support surface, and will surround the end portion of at least one of the plurality of support members; and wherein the predetermined configuration causes the fender panel to have a convex upper surface and a concave lower surface, and wherein the fender panel is thus configured to substantially prevent the collection of debris on an upper surface of the fender panel when supported by the plurality of support members.

12. The fender assembly of claim 11 wherein the fender panel is formed of a material selected from the group consisting of polymers, plastics, carbon fibers, and composites.

13. The fender assembly of claim 11 wherein the fender panel has a downwardly oriented outer surface and an inwardly directed lip so as to allow the fender panel to substantially surround the end portion of the support member.

14. The fender assembly of claim 13 wherein the plurality of support members comprises a first extension, a second extension and a flap bracket, and wherein the first extension and the second extension have end portions surrounded by the fender panel, and the flap bracket has a containment panel extending downwardly so as to capture the outer surface of the fender panel.

15. The fender assembly of claim 11 wherein the fender panel has a concave lower surface which is substantially parallel with the convex upper surface when viewed in a transverse direction, and wherein the fender panel surface is substantially linear in a longitudinal direction.

16. The fender assembly of claim 15 wherein the fender panel is a single layer of non-metallic material.

17. The fender assembly of claim 16 wherein the fender panel is formed through extrusion and has a cross-sectional configuration that is substantially constant along its length.

18. The fender assembly of claim 11 wherein the downwardly oriented outer surface is connected to the support members via at least one of the connectors.

19. The fender assembly of claim 18 wherein the connectors are selected from the group comprising bolts, rivets or screws.

20. The fender assembly of claim 11 wherein the fender panel is a single layer of non-metallic material formed through extrusion and thus has a cross-sectional configuration that is substantially constant along its length.

* * * * *